United States Patent Office 2,782,185
Patented Feb. 19, 1957

2,782,185
DISAZO DYESTUFFS

Ernst Merian, Allschwil, Switzerland, assignor, by mesne assignments, to Saul & Co., Newark, N. J., as nominee of Fidelity Union Trust Company No Drawing. Application October 26, 1953, Serial No. 388,437

Claims priority, application Switzerland October 31, 1952

1 Claim. (Cl. 260—186)

The present invention relates to water-insoluble disazo dyestuffs which correspond to the formula

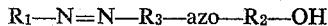

R₁—N=N—R₃—azo—R₂—OH wherein each of R₁ and R₂ stands for a radical of the benzene series which is free from sulfonic acid gorups, sulfonic acid amide groups and carboxyl groups, and which together contain at least one methoxy group in ortho-position to —N=N— or —azo—, wherein R₃ stands for a radical of the benzene or naphthalene series and is free from sulfonic acid groups, sulfonic acid amide groups and carboxyl groups, and wherein —OH is in para-position to —azo—.

According to the present invention these disazo dyestuffs are obtained by coupling one mol of the diazo compound of an aminobenzene which may contain a methoxy group in ortho-position to the amino group with one mol of an amine of the benzene or naphthalene series which couples in para-position to the amino-group, then further diazotizing the obtained monoazo compound and coupling it with one mol of a hydroxybenzene which couples in para-position to the hydroxyl group and which may be substituted by a lower alkoxy group in meta-position to the hydroxyl group.

Similar disazo dyestuffs, in which however neither the R₁ nucleus nor the R₂ nucleus carry a lower alkoxy group in ortho-position to the —N=N— group or to the —azo— group, have previously been prepared. The dyestuffs which do not have a methoxy group in the R₁ nucleus are bound up with the disadvantage that they dye cellulose ester fibers and synthetic polyamide fibers only at relatively high temperatures and rather weakly. It has therefore been proposed to obviate this disadvantage by introducing an acetylamine group into the R₁ nucleus. The so-obtained dyestuffs do indeed draw onto the fibers at low temperatures and give relatively strong dyeings; however, they are inferior to the first-named products with respect to the fastness to wet treatments.

According to the present invention, surprisingly, the introduction into the R₁ nucleus of a methoxy group in ortho-position to the —N=N— group also appreciably enhances the affinity of the disazo dyestuff for cellulose ester fibers and synthetic polyamide fibers, but without impairing the fastness to wet treatments, which fastness is rather further improved.

It is also noteworthy that, unexpectedly, the said methoxy substitution results in no change or only in a very slight change in the shade of the dyestuff.

The fact that the introduction of a methoxy group into the R₁ nucleus brings about an improvement in affinity is in itself astonishing, since as a rule an increase in the molecular weight of the disazo dyestuff of the formula

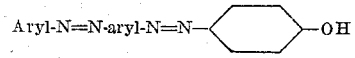

Aryl-N=N-aryl-N=N—⟨ ⟩—OH by side substituents brings about an impairment of affinity. Thus, for example, the dyestuff of formula

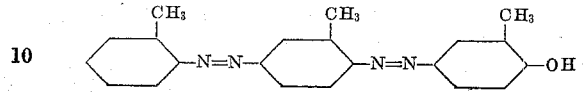

produces a 40% weaker dyeing on acetate silk than does the dyestuff of formula

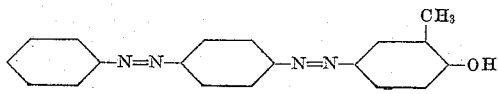

In this connection the position of the introduced methoxy group is of essential significance. A substition of the R₁ nucleus by an alkoxy group in meta-position or in para-position to the azo bridge appreciably reduces the affinity of the dyestuffs. As a matter of fact, the affinity of such products is even less than in the case of the corresponding dyestuffs which are free of alkoxy groups.

Disazo dyestuffs which contain no lower alkoxy group in the R₂ nucleus, dyes cellulose ester fibers, synthetic polyamide fibers and polyester fibers only in yellow, orange and red-brown shades. It could not be foreseen that the introduction of an alkoxy into the R₂ nucleus would exert a surprisingly strong bathochrome influence. The introduction of the alkoxy group into the R₂ nucleus makes it possible to prepare sought-after red and ruby colored dispersion dyestuffs, which possess outstanding fastness properties particularly on synthetic polyamide fibers.

In this case also, the position of the alkoxy group is essential; it must be in ortho-position to the azo group. Thus, for example, dyestuffs of the type of the following formula

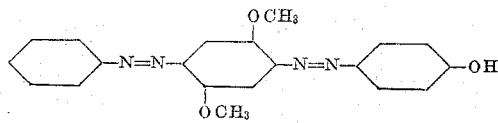

yield orange dyeings while the dyestuff corresponding to the formula

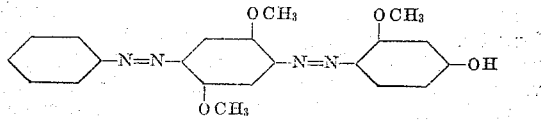

yields a bluish ruby-red dyeing. The effect of the introduction of an alkoxy group into the R₂ nucleus is all the more surprising, since, for example, the introduction of an alkyl group into the said nucleus does not result in the color displacement brought about by the alkoxy group. It is also noteworthy that the disazo dyestuffs obtained by coupling diazomonoazo compounds of the present invention with 1,3-dihydroxybenzene have practically no affinity for the above-named fibers and that their dyeings are inadequate as to fastness to light, while the products of the present invention which contain a 1-hydroxy-3-alkoxybenzene end component possess the aforesaid valuable properties.

The new disazo dyestuffs dye cellulose ester fibers, synthetic polyamide fibers and polyester fibers in pure yellow, orange, scarlet, ruby-red and red-brown shades of excellent fastness to light, to washing and to sublimation. In addition the dyeings are distinguished by outstanding stability to combustion gases, so-called "gas fumes." The new dyestuffs are also outstandingly suitable for dyeing the said fibers when used in admixture with known hydroxy-disazo dyestuffs, such mixtures being advantageously obtained in the process of preparing the new dyestuffs. Instead of one hydroxybenzene as end component, use can also be made of a mixture of two or more hydroxybenzenes. Valuable mixtures of disazo dyestuffs are also obtained when, in preparing the dyestuffs of the present invention, use is made of a starting component consisting of a mixture of two or more different aminobenzenes. The production of dyestuff mixtures of this type is a further object of the present invention.

The new dyestuffs are obtained by diazotizing an aminobenzene which may contain a methoxy group in ortho-position to the amino group and then coupling the product with an aminobenzene or a 1-aminonaphthalene in para-position to the amino group. The obtained monoazo compounds are further diazotized in solution or in suspension and coupled with a hydroxybenzene, which may contain a lower alkoxy group in meta-position to the hydroxyl group, in para-position to said hydroxyl group. In many cases, it is advantageous to couple the diazotized initial component with the ω-methane sulfonic acid of the middle component and then to split off the ω-methane sulfonic acid radical from the resultant monoazo dyestuff, prior to further working up. The new disazo dyestuffs may be worked up by filtering the aqueous coupling medium and washing and drying the filter cake. In order to obtain suitable dyeing preparations, the thus-obtained products are preferably ground in the presence of suitable dispersing agents and, if desired, in the presence of inorganic and organic fillers. The dyestuff pastes can also be admixed in the moist state with suitable dispersing agents and only subsequently dried, for example, in an atomizing drier.

Illustrative of aminobenzenes, which in the form of their diazo compounds may serve as starting components, are for example: 1-amino-2-methoxybenzene, 1-amino-2-methoxy-4-methylbenzene, 1-amino-2-methoxy-5-methylbenzene, 1-amino-2,4-dimethoxybenzene, 1-amino-2,5-dimethoxybenzene, 1-amino-2-methoxy-4-chlorobenzene, 1-amino-2-methoxy-4-bromobenzene, 1-amino-2-methoxy-4-fluorobenzene, 1-amino-2-methoxy-4-acetylaminobenzene, 1-amino-2,5-dimethoxy-4-acetylaminobenzene and 1-amino-2-methoxy-4-acetylamino-5-methylbenzene.

Suitable middle components are, for example, the following amines of the benzene and naphthalene series which couple in para-position to the amino group: aminobenzene, 1-amino-2-methylbenzene, 1-amino-3-methylbenzene, 1-amino-2-methoxybenzene, 1-amino-3-methoxybenzene, 1-amino-2-methoxy-5-methylbenzene, 1-amino-3-methoxy-6-methylbenzene, 1-amino-2,5-dimethoxybenzene, 1-amino-2,5-diethoxybenzene, 1-amino-2-chloro-5-methylbenzene, 1-aminonaphthalene and 1-amino-2-methoxynaphthalene, it being advantageous to use some of these in the form of their ω-methane sulfonic acids.

As end components, use may be made for example of hydroxybenzene, 1-hydroxy-2-methylbenzene, 1-hydroxy-3-methylbenzene, 1-hydroxy-2-chlorobenzene, 1-hydroxy-3-chlorobenzene, 1-hydroxy-2-methoxybenzene, 1-hydroxy-3-methoxybenzene, 1-hydroxy-2-ethoxybenzene, 1-hydroxy-3-ethoxybenzene, 1-hydroxy-2-propoxybenzene, 1-hydroxy-3-propoxybenzene, 1-hydroxy-2-hydroxyethoxybenzene, 1-hydroxy-3-hydroxyethoxybenzene, 1-hydroxy-2-alkoxyethoxybenzenes, 1-hydroxy-3-alkoxyethoxybenzenes, 1-hydroxy-2-methyl-5-alkoxybenzenes, 1-hydroxy-2,5-dialkoxybenzenes and 1-hydroxy-2-halogen-5-alkoxybenzenes.

The following examples illustrate the invention without being limitative thereof. The quantities and temperatures may be varied in some cases within the scope of the foregoing description. The parts are parts by weight and the percentages are percentages by weight; the temperatures are in degrees centigrade.

*Example 1*

24.5 parts of 1-amino-2-methoxybenzene are dissolved in 400 parts of water and 64 parts of concentrated hydrochloric acid. The solution is cooled to 0° by the addition of 400 parts of ice, and then a solution of 14 parts of sodium nitrite in 40 parts of water is added. Upon completion of the ensuing diazotization, there is added dropwise to the diazo mixture a solution of 27 parts of 1-amino-2-methoxy-5-methylbenzene in 500 parts of water and 32 parts of concentrated hydrochloric acid, 45 parts of sodium acetate being added to the mass to accelerate the coupling. Upon completion of the latter 200 parts of sodium chloride are added to the mass and the precipitated monoazo compound is filtered off. It is stirred into 2000 parts of water and 64 parts of concentrated hydrochloric acid, after which the suspension is adjusted to 5° by the addition of ice, and diazotization carried out with the aid of a solution of 15 parts of sodium nitrite in 50 parts of water. The diazo solution is then filtered and the obtained filtrate is combined with a solution of 20 parts of hydroxybenzene in 200 parts of water, 48 parts of sodium carbonate, 21 parts of aqueous sodium hydroxide solution of 36% strength and 80 parts of sodium acetate at 0–5°, whereupon coupling to the disazo compound takes place. There is obtained a brown powder which corresponds to the formula

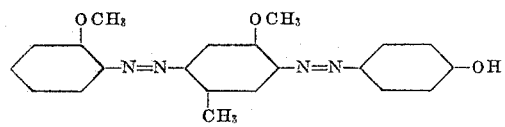

and dyes acetate silk, synthetic polyamide fibers such as nylon and perlon, and polyester fibers such for example Dacron, in yellow-orange shades of outstanding fastness properties.

By way of comparison the dyestuff which contains the radical of aminobenzene as the initial component yields dyeings which are 35% weaker than those obtained with the dyestuff of the present example, while the dyestuff with the radical of 1-amino-3-methoxybenzene as initial component is 55% weaker than the dyestuff of the present example.

*Example 2*

16 parts of 1-amino-2-methoxybenzene are diazotized in an analogous manner to that described in the previous example. The diazo solution is combined, at 0°, with a warm previously-prepared solution of 20 parts of 1-amino-2,5-dimethoxybenzene in 300 parts of water and 30 parts of concentrated hydrochloric acid, it being possible to accelerate the coupling by the dropwise addition of a solution of 45 parts of sodium acetate in 100 parts of water. Upon completion of the coupling, the monoazo compound is filtered, stirred in the form of the moist paste into 600 parts of water and 40 parts of concentrated hydrochloric acid, and diazotized at 10° with the aid of a solution of 9 parts of sodium nitrite in 30 parts of water. Impurities which may be present in minor amount are eliminated from the solution, which is then combined at 0° with a solution of 13 parts of hydroxy-benzene, 700 parts of water, 13 parts of aqueous sodium hydroxide solution of 36% strength, 50 parts of sodium acetate and 30 parts of sodium carbonate.

The precipitated disazo dyestuff which corresponds to the formula

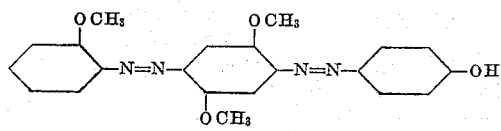

is filtered, washed neutral and dried. There is obtained a brown powder which dyes acetate silk, synthetic polyamide fibers and polyester fibers in red-orange shades of outstanding fastness properties.

By way of comparison, the dyestuff with aminobenzene as initial component is 35% weaker, in its dyeing action, than the dyestuff of the present example; the dyestuff with 1-amino-3-methoxybenzene as the starting component is also 35% weaker; while the dyestuff with 1-amino-4-methoxybenzene as starting component is 75% weaker.

*Example 3*

11.8 parts of aminobenzene are diazotized in an analogous manner as described in Example 1, and then coupled with 20 parts of 1-amino-2,5-dimethoxybenzene. The coupling mixture is stirred for about 10 hours. The monoazo dyestuff separates out as an orange-yellow precipitate. By the addition of 20 parts of concentrated hydrochloric acid, the suspension is rendered acid to congo, after which the dyestuff is filtered off. The obtained dyestuff paste is diazotized after the manner described in Example 2. After a short time, the resultant solution is filtered from the slight impurities which are present, and then a solution of 16 parts of 1-hydroxy-3-methoxybenzene, 700 parts of water, 13 parts of aqueous sodium hydroxide solution of 36% strength, 50 parts of sodium acetate and 30 parts of sodium carbonate is added at 0-5°, whereupon coupling to the disazo dyestuff takes place. The latter is filtered, washed neutral and dried. There is obtained a brown powder which corresponds to the formula

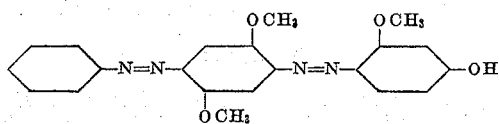

and which dissolves with carmine-red coloration in ethanol and with sea-green coloration in concentrated sulfuric acid. It dyes acetate silk, synthetic polyamide fibers such as nylon and perlon and polyester fibers such as Dacron in pure bluish red shades with outstanding fastness properties.

*Example 4*

61.5 parts of 1-amino-2-methoxybenzene are stirred into 200 parts of water and 160 parts of concentrated hydrochloric acid. After the addition of 300 parts of ice, a solution of 35 parts of sodium nitrite in 100 parts of water is added to the mass. The temperature of the now-present diazo solution is adjusted to 0° by the addition of 350 parts of ice, after which a solution of 76.5 parts of 1-amino-2,5-dimethoxybenzene in 500 parts of water and 62 parts of concentrated hydrochloric acid is added. The reaction of the mass is then adjusted to neutrality to congo by means of an aqueous solution of 130 parts of sodium acetate, and the mass is stirred for several hours. 300 parts of sodium chloride are then added, after which the monoazo dyestuff is filtered with the aid of suction. The thus-obtained paste is then stirred into 1000 parts of water and 160 parts of concentrated hydrochloric acid and, after the addition of 200 parts of ice, diazotized with a solution of 35 parts of sodium nitrite in 100 parts of water. The slight impurities are filtered from the resulting solution which is then combined with a solution of 23.5 parts of hydroxybenzene, 31 parts of 1-hydroxy-3-methoxybenzene, 500 parts of water, 55 parts of an aqueous sodium hydroxide solution of 36% strength and 60 parts of sodium carbonate. The obtained mixture of disazo dyestuffs which correspond to the formulae

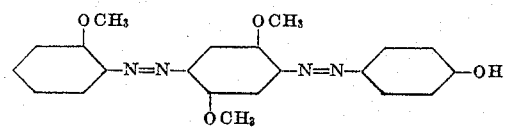

and

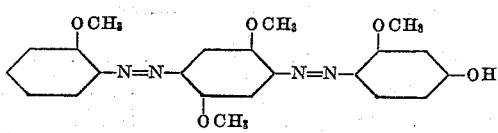

is isolated. It dyes acetate silk, synthetic polyamide fibers and polyester fibers in pure red shades of outstanding fastness properties.

*Example 5*

24.5 parts of 1-amino-2-methoxybenzene are diazotized in the same way as described in Example 1. Into the thus obtained solution there is dropped a hot solution of 38 parts of 1-amino-2-ethoxynaphthalene in 800 parts of water and 32 parts of concentrated hydrochloric acid while simultaneously cooling below 5° with ice. The coupling is accelerated by the dropwise addition of a solution of 76 parts of sodium acetate in 200 parts of water. Upon completion of the coupling the monoazo compound is precipitated with the aid of 35 parts of concentrated hydrochloric acid and 250 parts of sodium chloride. After some time the intermediate monoazo dyestuff is separated by filtration, then stirred into 2000 parts of water and 64 parts of concentrated hydrochloric acid and diazotized at 15-20° with the aid of a solution of 16 parts of sodium nitrite in 50 parts of water. Impurities which may be present in minor amounts are eliminated by filtration from the solution which is then combined with 25 parts of 1-hydroxy-3-methoxybenzene, it being possible to accelerate the coupling by the dropwise addition of 50 parts of a 25% aqueous solution of ammonia. The new disazo dyestuff is filtered, washed until neutral and dried. It corresponds to the formula

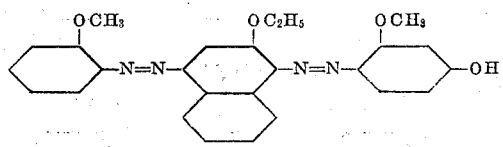

and is a violet-black powder which dissolves with violet coloration in ethanol and with green coloration in concentrated sulfuric acid. It dyes acetate silk, synthetic polyamide fibers and polyester fibers in violet shades.

The following table sets forth additional examples of embodiments of the present invention. In such table the new dyestuffs are characterized in terms of initial, middle and end component and by the shade of their dyeings.

They may be prepared after the manner of the preceding examples.

| Example No. (1) | Aminobenzene (initial component) (2) | Amine of the benzene or naphthalene series (middle component) (3) | Hydroxybenzene (end component) (4) | Shade on Cellulose ester fibers, synthetic polyamide fibers and polyester fibers (5) |
|---|---|---|---|---|
| 6 | 1-amino-2-methoxybenzene | 1-amino-2,5-dimethoxybenzene | 1-hydroxy-2-methylbenzene | red-orange. |
| 7 | do | do | 1-hydroxy-3-methylbenzene | Do. |
| 8 | do | 1-amino-2-methoxy-5-methylbenzene | 1-hydroxy-2-methylbenzene | yellow-orange. |
| 9 | do | do | 1-hydroxy-3-methylbenzene | Do. |
| 10 | 1-amino-2,5-dimethoxybenzene | do | hydroxybenzene | brown-orange. |
| 11 | do | 1-amino-2,5-dimethoxybenzene | do | red-brown. |
| 12 | 1-amino-2-methoxybenzene | 1-amino-2-methoxynaphthalene | do | Do. |
| 13 | 1-amino-2,5-dimethoxybenzene | do | do | yellow-brown. |
| 14 | 1-amino-2-methoxybenzene | 1-amino-2,5-dimethoxybenzene | 1-hydroxy-2-chlorobenzene | red-orange. |
| 15 | 1-amino-2-methoxy-5-methylbenzene | 1-amino-2-methoxy-5-methylbenzene | hydroxybenzene | yellow-orange. |
| 16 | 1-amino-2,5-dimethoxy-4-acetylaminobenzene | 1-amino-2,5-dimethoxybenzene | do | brown-orange. |
| 17 | 1-amino-4-methoxybenzene | do | 1-hydroxy-3-methoxybenzene | bluish red. |
| 18 | 1-amino-4-acetylaminobenzene | do | do | Do. |
| 19 | 1-amino-2-methoxybenzene | do | 1-hydroxy-3-ethoxybenzene | Do. |
| 20 | do | do | 1-hydroxy-3-methoxybenzene | Do. |
| 21 | 1-amino-4-acetylbenzene | do | do | bluish red. |
| 22 | 1-amino-4-propionylbenzene | do | do | Do. |
| 23 | 1-amino-3-acetylbenzene | do | do | brick red. |
| 24 | 1-amino-2-methoxybenzene | 1-amino-2-methoxy-5-methylbenzene | 1-hydroxy-2-methoxybenzene | red-orange. |
| 25 | do | do | 1-hydroxy-3-methoxybenzene | scarlet-red. |
| 26 | 1-amino-4-acetylaminobenzene | do | do | Do. |
| 27 | aminobenzene | do | do | brick-red. |
| 28 | do | 1-amino-2,5-dimethoxybenzene | mixture of hydroxybenzene and 1-hydroxy-3-methoxybenzene | scarlet-red. |
| 29 | 1-amino-4-acetylaminobenzene | do | do | pure red. |
| 30 | mixture of 1-amino-4-acetylaminobenzene and 1-amino-2-methoxybenzene | do | do | Do. |
| 31 | 1-amino-4-acetylaminobenzene | do | 1-hydroxy-3-methoxybenzene | bluish red. |

The formulae of dyestuffs of representative examples are for instance:

*Example 20*

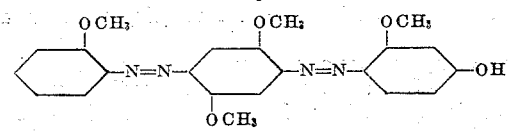

*Example 25*

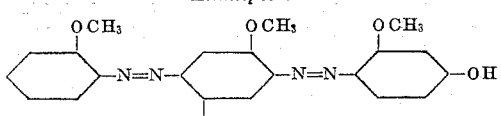

*Example 26*

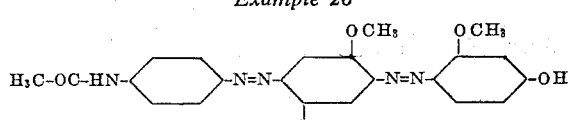

*Example 31*

*Example 32*

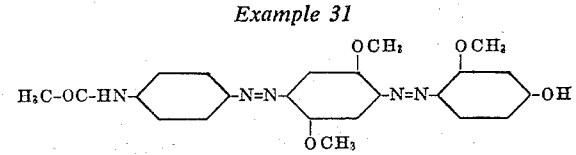

0.6 part of the dyestuff according to Example 1 is dispersed with the aid of Turkey red oil and used for dyeing 100 parts of acetate silk in a soap bath in the usual manner, preferably at raised temperature. Yellow-orange shades of excellent fastness properties are obtained. To improve the dispersion, the dyestuff may be preliminarily ground with suitable wetting agents, dispersing agents or emulsifiers, preferably in the presence of inorganic salts such for example as Glauber's salt.

*Example 33*

10 parts of an aqueous paste, of 20% strength, of the dyestuff according to Example 4 are intimately admixed with 10 parts of diethylene glycol and 80 parts of gum arabic thickener. The obtained printing paste yields red prints of excellent fastness properties on acetate silk and polyamide fibers, after steaming.

Having thus disclosed the invention what is claimed is:
The disazo dyestuff which corresponds to the formula

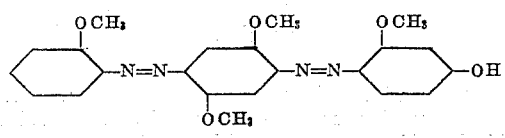

References Cited in the file of this patent
UNITED STATES PATENTS

| 2,072,252 | Ellis | Mar. 2, 1937 |
| 2,563,091 | Wright | Aug. 7, 1951 |